June 11, 1963  R. K. MAY ET AL  3,093,370
WORKHOLDER WITH MEANS FOR THERMAL COMPENSATION
Filed Nov. 20, 1957  2 Sheets-Sheet 1
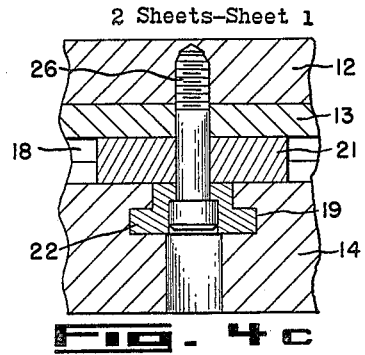
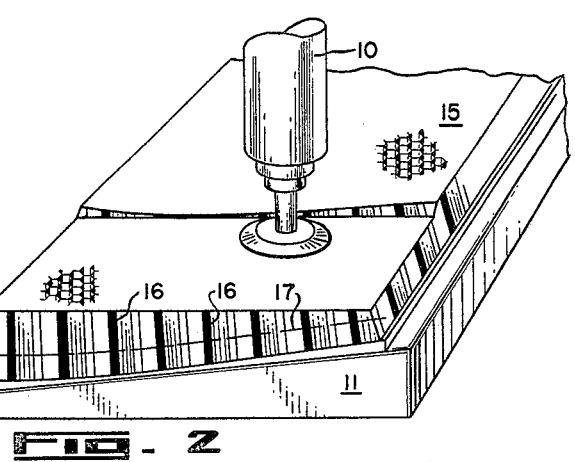
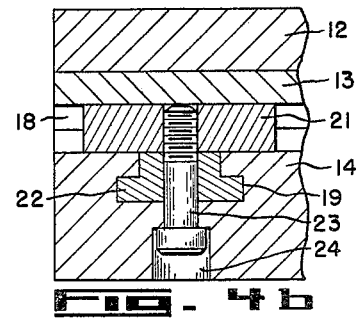
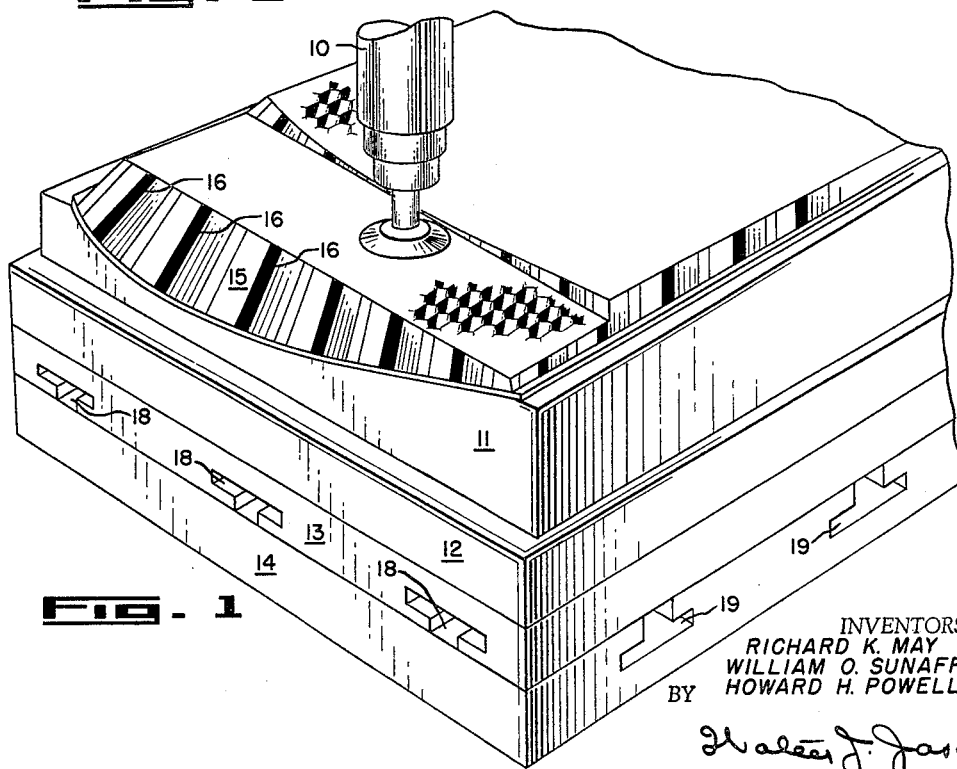
INVENTORS
RICHARD K. MAY
WILLIAM O. SUNAFRANK
HOWARD H. POWELL
BY
ATTORNEY June 11, 1963 R. K. MAY ET AL 3,093,370
WORKHOLDER WITH MEANS FOR THERMAL COMPENSATION
Filed Nov. 20, 1957 2 Sheets-Sheet 2
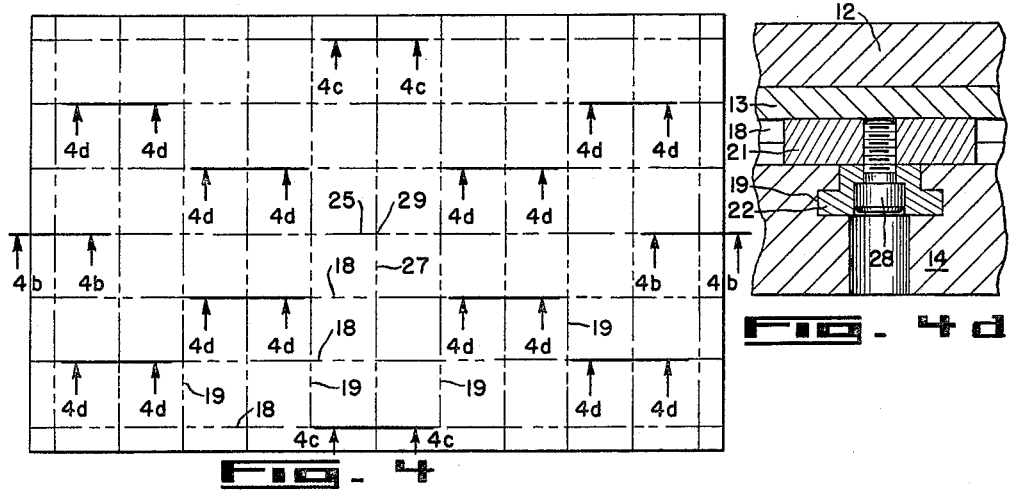
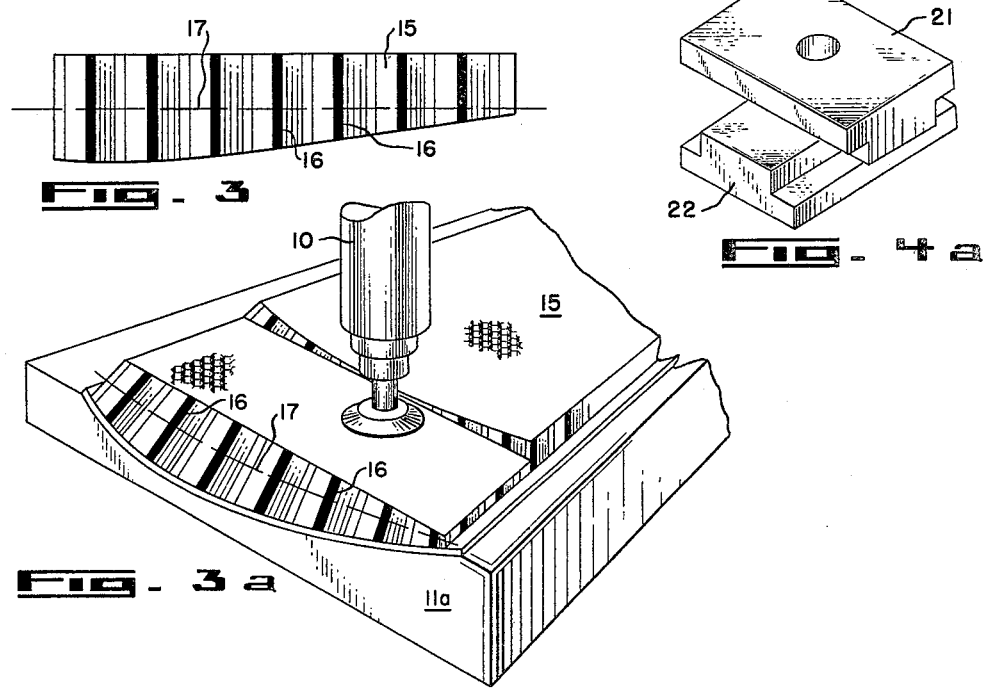
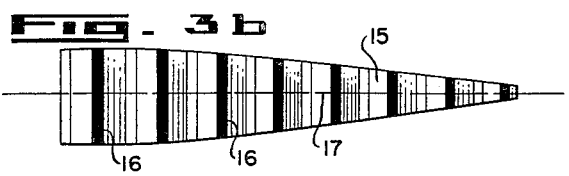
INVENTORS
RICHARD K. MAY
WILLIAM O. SUNAFRANK
BY HOWARD H. POWELL
ATTORNEY United States Patent Office 3,093,370
Patented June 11, 1963

3,093,370
WORKHOLDER WITH MEANS FOR THERMAL COMPENSATION
Richard K. May, William O. Sunafrank, and Howard H. Powell, Fort Worth, Tex., assignors to General Dynamics Corporation, San Diego, Calif., a corporation of Delaware
Filed Nov. 20, 1957, Ser. No. 697,645
1 Claim. (Cl. 269—309)

This invention relates generally to improvements in contour profiling and more particularly to a novel method and apparatus for machining contour profiles of cellular material with plane cuts with provision for holding the workpiece during thermal expansion and contraction of its support.

The evolution of aircraft and missiles to their present state where they are required to operate at very high speeds, great altitudes and over long ranges has necessitated many changes in manufacturing techniques and equipment. To achieve an aircraft or missile which will satisfy the stringent operational demands made of it, the structural components of such vehicles, particularly those components that are exposed to aerodynamic flow, must be capable of withstanding the very high temperatures generated by air friction; have inherent insulating characteristics and possess an optimum strength to weight ratio. The use of a structural composite type of member, usually designated as of cellular cored sandwich construction, and comprising a honeycomb-like cellular core element, having two facings of sheet material or face plates, is generally accepted by those skilled in the art of aircraft structural design as being most conclusive to the achievement of such design criteria. The cellular core element of said structural composite is normally manufactured in block or rectangular form and must subsequently be machine-profiled to conform to the shape of the aircraft component to which it is to be adapted.

Inasmuch as the structural integrity of such sandwich panel structural components is dependent to a large degree upon the quality of the joint between the edges of the cellular core and the inner surfaces of the facing plates, it follows that the profile as defined by the machined cellular core must conform precisely with the design configuration of the airframe or missile components of which it is to be an element, and therefore must be dimensionally consistent to a very high degree. Consequently, said cellular core must be shaped by machining to very close tolerances and be substantially free of burrs, deformations and other defects. It has heretofore been the common practice, in shaping curvate surfaces on cellular core material, to support the walls of each individual cell of the core material by filling the cellular apertures thereof with solidifiable material and solidifying the same, then machining the resulting high density mass with conventional contour mill cutters such as the stylus and pattern type or the multiple pass type known to the trade as "Keller" or "Hydratel" machines.

Many disadvantages are inherent in such processes, however, and deleterious effects often resulted therefrom. For example, solidifying of the material was usually done by freezing which also effected a temperature change in the milling fixture holding the core material. This produced a dimensional change in the fixture which would cause it to warp or buckle since it was rigidly secured to a support fixture for immobilizing the core material during the milling operation. Consequently the resultant contour of the core material when the milling operation was finished was not within the exacting tolerances required. Moreover, the large machines employed are expensive, slow, and leave a rough, dented and deformed edge portion on the cell walls. The method of effecting a curve by making many cuts, each with a small displacement and/or angle differential, as related to the preceding cut, will not yield a smooth even curve unless much time is sacrificed to make a near infinite number of overlapping cuts. A smooth, uniform, burr-free surface rarely results from these operations and deformation and chipping of the filler material is commonplace.

These defects and disadvantages have been overcome by the method and apparatus of the present invention wherein the contour profiles are made with planar cuts and wherein the milling fixture provides for thermal changes without buckling or warping. The milling fixture is mounted to the support fixture with a plurality of longitudinally movable mountings, transversally movable mountings, and other mountings which will "float" or move in either planar direction. The milling fixture has its upper surface contoured such that the cellular material is held in non-planar position. A plane cut in the cellular material is then made. When released from the milling fixture, the spring-like elasticity of the material returns it from deformation to its original position and the plane cut surface then becomes the shape of the desired contour. The material may then be reversed and mounted on a second contoured milling fixture so that a second planar cut will contour the other side in a similar manner.

It is therefore a primary object of the present invention to provide for an improved method and apparatus for machining contour profiles in cellular core material.

Another object is the provision of apparatus for holding a workpiece in deformed position while making plane cuts.

Another object is the provision of a milling fixture for holding a workpiece wherein the fixture is mounted for expansion and contraction without buckling or warping.

Another object is the provision of a milling fixture with dimensions subject to thermal changes for immobilizing a workpiece during a milling operation.

Another object is the provision of a milling fixture for holding a workpiece during milling operations wherein the milling fixture is positioned with longitudinal, transverse and freely movable planar mountings.

Another object is the provision of a milling fixture with an upper contoured surface for maintaining a flexible cellular core material in deformed condition.

Another object is the provision of a milling fixture having an upper contoured surface of such shape that a plane cut through a flexible material deflected thereagainst will provide a desired contour on one side of the material when it is restored to normal position.

Another object is the provision of a method of contour profiling wherein the desired contour is made by deflecting the plane of the material, making a planar cut and restoring the material back to its normal position.

Another object of this invention is to provide a novel machining process that will effect a smooth, burr-free, evenly curved close tolerance contoured surface on flexible, low density material using conventional, existing devices for machining straight plane surfaces.

Other objects and features of the present invention will be readily apparent to those skilled in the art from the following specification and appended drawings wherein is illustrated a preferred form of the invention, and in which:

FIGURE 1 is a view of the preferred exemplary form of apparatus that is adapted to carry out one step of the process embodying the invention.

FIGURE 2 is a perspective view of the work arrangement for the first step of the preferred process for machining a double convex rudder core from a block or log of flat aluminum honeycomb.

FIGURE 2a is a sectional view of the profiled aluminum core after step one of the machining process is completed and the core has been released from the mill fixture shown in FIGURE 2.

FIGURE 3 is a view of the core, shown in FIGURE 2a, as it appears when inverted and ready for installation in the second mill fixture.

FIGURE 3a is a view of the work arrangement for the second step of the preferred machining process, as employed for shaping a double convex rudder core.

FIGURE 3b is a sectional view of the profiled core of FIGURE 3 after the second step is completed and it has been released from the second mill fixture.

FIGURE 4 is a diagram illustrating the preferred form of milling fixture or platen (used to control the heat cycle of the mill fixture), showing the points at which it is affixed to the base of the milling machine.

FIGURE 4a shows the preferred fastening means, a T-shaped member, used to fasten the platen to the base of the machine.

FIGURE 4b is a partial cross-sectional view of FIGURE 4 as taken at points 4b—4b.

FIGURE 4c is a partial cross-sectional view of FIGURE 4 at points 4c—4c.

FIGURE 4d is a partial cross-sectional view of FIGURE 4 at points 4d—4d.

An enlarged view of the preferred arrangement of apparatus used in practicing the present invention is shown in FIGURE 1. Here a rotary mill cutter 10 is representative of any milling, cutting, grinding or other machine suitable to remove areas of metal as desired. This preferred cutting tool is the subject matter in copending application Serial No. 639,045, filed February 8, 1957, for "Milling Cutter," and now abandoned. However, it is understood that other types of devices may be used if desired. Here a concave milling fixture 11 is mounted on a platen which consists of two pieces of light metal 12, 13 bonded together in use. This platen in turn is supported on a base or support fixture 14 in a manner to be more fully described with reference to other figures. A sheet of cellular honeycomb core material 15 is deformed and held in position with its lower surface engaging the concave upper surface of the mill fixture 11. This of course deforms the upper surface of the material but the mill cutter 10 is used to make a planar cut on the upper surface in the manner shown. The cellular honeycomb core material 15 is of low density and is flexible to permit its deformation to fit the contour of the mill fixture 11. As shown the normally parallel walls 16 of the core material when the material is deformed are no longer in parallel relationship. Other types of cellular core material may be used which is capable of deflection within its elasticity characteristics. The cells may be filled with a solidifiable material, such as water frozen to ice, if desired, although with the cutter shown this is not necessary. The preferred method of maintaining the cellular material in its deflected position on the surface of the mill fixture 11 is by the use of freezing liquids as taught in copending application, Serial No. 633,214, now U.S. Patent No. 2,937,437, filed January 9, 1957, for Method and Apparatus for Holding a Workpiece, although, of course, other suitable hold-down techniques are known and may be used. The freezing liquid hold-down technique and for the filling of holes with a solidifiable material while superior in some respects to other techniques, presents the problem of maintaining the mill fixture 11 and hold-down platen 12, 13 securely connected to the base or support fixture 14 in a non-buckling and non-warping condition. This condition results from the manner in which the platen is secured when provision has not been made for expansion and contraction due to thermal changes. This problem has been overcome in the manner more clearly understandable with reference to other figures hereafter more fully described.

An exemplary application of the method of the present invention is its employment for the fabrication of a double convex rudder core from a block of aluminum honeycomb material. The initial step is illustrated in FIGURE 2. Here a sheet of cellular material 15 having parallel surfaces is flexed downwardly against the curved upper surface of the concave mill fixture. This may be done, as explained in copending application, Serial No. 633,214, by first holding down the material by use of a vacuum while the presence of small water droplets will cause adherence of the core material to the milling fixture when the droplets are reduced in temperature to below freezing. It is noted that in this first step the chord line 17 of the material is parallel with the contour surface of the milling fixture. A chord line is hereby defined as the line of a straight edge brought into contact with the lower surface of an airfoil section at two points. In the case of an airfoil having a double convex camber it is the straight line joining the leading and trailing edges. While the chord line initially is in a plane normal to the walls 16 of the material 15, as shown, it may be desirable to construct a panel in which the walls of the cellular material are directed toward some greater external force wherein it is desirable that greater rigidity be effected in this particular direction. After the material has been deflected to fit the contour of the milling fixture and secured thereto, the milling operation may be made in any suitable manner such as by straight or circular cuts in a plane surface. After the core material has been released from the milling fixture it will characteristically spring back to its normal position as long as the contour that has been machined did not exceed the elastic limits of the core material. As shown in FIGURE 2a the core material has been returned to its normal position with no bending force acting upon it and the chord line 17 is substantially a straight line. FIGURE 3 shows the cellular material of FIGURE 2a in inverted position ready for contouring the other surface. The material is then placed in a second milling fixture 11a against its contoured upper face in a manner previously described. It is noted that in profiling convex surfaces a concave surface of the milling fixture is provided. In the second milling fixture 11a, as shown in 3a, allowance must be made for the previous curvature since the under surface of this material no longer was a planar surface but instead has been milled previously to its desired contour. Therefore, the second contour surface must combine and total the desired curvatures of both sides of the double convex part. As previously described the top surface is then planed or milled to a flat surface in some convenient manner. When the milling operation has been completed the cellular material is then released from the second fixture. The resiliency of the material restores it to its normal position such that the chord 16 is again straight and the double convex part is complete as shown in FIGURE 3b. The next step would be to apply the outer skin panels in the manner well known in the art such as by bonding, brazing, welding, etc.

Double-convex core elements with mild contours may be effectively milled by eliminating step one of the above process. A single operation evolving the double contour in a single fixture is here employed. The limit of degree for this type contour is usually determined by the relative flexibility of the core, and the core must be acted upon by some outside force, such as the edge closure members of a sandwich panel construction, to cause it to retain its desired double-convex contour.

Due to contraction of metal during the freezing process, such as in filling the cores or as a means of securing the core to the fixture, the milling fixture, when bolted in the conventional manner to a support fixture, will contract unevenly resulting in buckling or warping. This may cause variations in the finished honeycomb parts beyond the tolerable limits of the finish requirements. Therefore the preferred means for attaching the mill fixture to a base fixture to avoid these undesirable effects is shown in FIGURES 1, 4, 4a, 4b, 4c, and 4d.

Referring back to FIGURE 1 there is shown an overall view of the preferred means of attachment of mill fixture 11 to its base or support fixture 14 through a temperature controlling platen 12. As previously mentioned this platen 12, 13 consists of two pieces of like metal bonded together. The top piece of metal 12 contains a preferred means for uniform temperature control, such as disclosed in copending application Serial No. 633,214, and the bottom piece 13 is divided at small intervals by longitudinal T slots 18. Mill fixture 11 acts as an over-platen, in this case, and is held down by conventional locating pins and vacuum grid, not shown, or by the freezing liquid method previously mentioned. These three pieces, i.e., mill fixture 11 and the two parts of platen 12, 13, are made of the same type metal and therefore will expand and contract uniformly. Base fixture 14 is insulated from platen part 13 to increase temperature controlling efficiency. Thus, the expansion temperature differential is between base 14 and platen part 13 and provision for this must be made in connecting the two members. Base 14 is divided at small intervals by transverse inverted T slots 19.

FIGURE 4 shows a gridded pattern formed by the longitudinal and transverse T slots. Here the longitudinal dashed lines 18 represent the longitudinal T slots 18 in the platen 13 in FIGURE 1 and the transverse dashed lines 19 represent the transverse inverted T slots 19 in the base fixture 14.

The preferred construction of fastening means is shown in FIGURE 4a. Here a T-shaped slidable member 21 is adapted to engage and slide in slots 18 and slidable member 22 is adapted to engage and slide in slots 19. When positioned at points of intersection of the transverse and longitudinal slots 18, 19, they may be secured together by a bolt (not shown in FIGURE 4a) inserted in the apertures through their respective centers.

FIGURE 4b is taken along the line 4b—4b in FIGURE 4 and shows the preferred manner in which the platen 12 is secured against movement in a transverse direction because of some external force. Here bolt 23 is seated within the base aperture 24 to prevent transverse movement of the lower slidable member 22 in slot 19 yet this does not prevent longitudinal movement of the platen over upper T member 21 due to its expansion and contraction with temperature changes. Since line 4b—4b is taken at each end of longitudinal center line 25, the platen may also expand and contract transversely in both directions from this center line. In other words longitudinal center line 25 may expand or contract in a longitudinal direction but otherwise will not move.

FIGURE 4c is taken along the line 4c—4c in FIGURE 4 and shows the preferred manner in which the platen is secured against movement in a longitudinal direction because of some external force. Here bolt 26 is extended upwardly beyond the upper slidable member 21 to engage platen 12, 13. This will permit transverse movement only of the platen due to its expansion and contraction. Since line 4c—4c is taken at each end of transverse center line 27, the platen may also expand and contract longitudinally in both directions from this center line. In other words center line 27 also may expand and contract but otherwise does not move. The free floating type of fastener is shown in FIGURE 4d with the bolt 28 engaging the two slidable members only and neither engages the lower platen or the base fixture.

This permits the platen to expand and contract in both transverse and longitudinal directions. This arrangement is adaptable to any size base and platen. Such fastening system renders every point on the platen free to move in its plane except mid point 29 with center lines 25 and 27 movable only in an axial direction.

The invention thus described exemplifies a novel machining method and apparatus for effecting contoured surfaces on flexible material, adapted particularly for use in connection with aircraft, whereby the desired configuration of the core normally consists of relatively mild contours that are within the elastic limits of the core. As described, the preferred hold down method is by means of freezing a liquid which necessitates special clamping to compensate for the expansion and contraction of the milling support while maintaining the material in a fixed position. Thus it is possible to provide a smooth, burr-free, evenly contoured surface on the material which will effect a stronger, more efficient bond, braze, or weld when the material is used as a component part of a composite sandwich panel construction.

While certain preferred embodiments of the invention have been specifically disclosed, it is understood that the invention is not limited thereto as many variations will be readily apparent to those skilled in the art and the invention is to be given its broadest possible interpretation within the terms of the following claim.

What we claim is:

Apparatus for holding material being machined including a base fixture and a platen for fixedly holding said material during expansion and contraction of said platen, means for securing said platen to said base fixture, said securing means comprising a plurality of spaced T slots in the bottom surface of said platen extending in one direction, said spaced T slots including a centrally located slot, a plurality of inverted T slots in said base fixture extending at right angles to said slots in the bottom of said platen, said inverted T slots including a centrally located slot, and elements slidable within said slots and engageable therewith, each of said elements comprising two sections secured together, one of said sections engaging a platen slot and the other of said sections engaging a base fixture slot at points of intersection of said slots, at least a pair of said elements with sections positioned and secured in said centrally located slot on said base fixture, and at least a pair of said elements having sections positioned and secured in said centrally located slot on said platen.

References Cited in the file of this patent

UNITED STATES PATENTS

| | | |
|---|---|---|
| 316,074 | Stackpole | Apr. 12, 1885 |
| 576,023 | Bosworth | Jan. 26, 1897 |
| 995,537 | Hertner et al. | June 20, 1911 |
| 1,332,445 | Mershon | Mar. 2, 1920 |
| 1,936,017 | Heuze | Nov. 21, 1933 |
| 1,983,009 | Soderberg | Dec. 4, 1934 |
| 2,081,639 | Perry et al. | May 25, 1937 |
| 2,152,801 | Harrington | Apr. 4, 1939 |
| 2,167,215 | Leary | July 25, 1939 |
| 2,203,937 | Bailey | June 11, 1940 |
| 2,221,436 | Remington | Nov. 12, 1940 |
| 2,241,478 | Remington | May 13, 1941 |
| 2,782,661 | Lewis | Feb. 26, 1957 |
| 2,826,125 | Dougherty | Mar. 11, 1958 |
| 2,855,664 | Griffith et al. | Oct. 14, 1958 |
| 2,905,064 | Nielson | Sept. 22, 1959 |
| 2,937,437 | Cole et al. | May 24, 1960 |